United States Patent
Huang et al.

(10) Patent No.: US 11,874,451 B2
(45) Date of Patent: Jan. 16, 2024

(54) HIGH NUMERICAL APERTURE SELECTIVE PLANE ILLUMINATION MICROSCOPY

(71) Applicant: The Regents of the University of California, Oakland, CA (US)

(72) Inventors: Bo Huang, San Francisco, CA (US); Bin Yang, San Francisco, CA (US)

(73) Assignee: The Regents of the University of California, Oakland, CA (US)

(*) Notice: Subject to any disclaimer, the term of this patent is extended or adjusted under 35 U.S.C. 154(b) by 513 days.

(21) Appl. No.: 16/966,829

(22) PCT Filed: Jan. 31, 2019

(86) PCT No.: PCT/US2019/016086
§ 371 (c)(1),
(2) Date: Jul. 31, 2020

(87) PCT Pub. No.: WO2019/152670
PCT Pub. Date: Aug. 8, 2019

(65) Prior Publication Data
US 2021/0041683 A1 Feb. 11, 2021

Related U.S. Application Data

(60) Provisional application No. 62/624,261, filed on Jan. 31, 2018.

(51) Int. Cl.
*G02B 21/02* (2006.01)
*G02B 21/33* (2006.01)
(Continued)

(52) U.S. Cl.
CPC ............. *G02B 21/33* (2013.01); *G02B 21/02* (2013.01); *G02B 21/06* (2013.01); *G02B 21/16* (2013.01); *G02B 21/18* (2013.01)

(58) Field of Classification Search
CPC ........ G02B 21/00; G02B 21/33; G02B 21/36; G02B 21/02; G02B 21/06; G02B 21/16;
(Continued)

(56) References Cited

U.S. PATENT DOCUMENTS 10,266,888 B2 * 4/2019 Daugharthy ......... C12Q 1/6841
2011/0261446 A1 * 10/2011 Dunsby .................. G02B 21/16
359/380

(Continued)

FOREIGN PATENT DOCUMENTS

DE 102013105586 A1 12/2014
WO WO2017210159 A1 12/2017
WO WO2018089865 A1 5/2018

OTHER PUBLICATIONS

Supplementary European Search Report dated Mar. 3, 2022 far European Patent Appiicaiion No. 19747208.7.
(Continued)

*Primary Examiner* — Mustak Choudhury
(74) *Attorney, Agent, or Firm* — Thomas | Horstemeyer, LLP (57) ABSTRACT

In one embodiment, a microscopy system includes a first objective positioned adjacent to a sample to be imaged, the first objective being configured to both illuminate the sample with light and collect light from the sample, and a remote imaging module positioned remotely from the first objective and the sample, the remote imaging module being configured to rotate the image plane of the collected light.

22 Claims, 8 Drawing Sheets

(51) Int. Cl.
*G02B 21/06* (2006.01)
*G02B 21/16* (2006.01)
*G02B 21/18* (2006.01)

(58) Field of Classification Search
CPC .. G02B 21/18; G02B 21/0088; G02B 21/082; G02B 21/367; G02B 21/0032; G02B 21/0052; G02B 21/361; G02B 2207/113; G02B 23/04
See application file for complete search history.

(56) References Cited

U.S. PATENT DOCUMENTS

| | | | | |
|---|---|---|---|---|
| 2014/0320601 | A1* | 10/2014 | Cutrale | G02B 21/16 348/46 |
| 2016/0327779 | A1* | 11/2016 | Hillman | G02B 21/0032 |
| 2020/0278525 | A1* | 9/2020 | Strnad | G02B 21/0088 |

OTHER PUBLICATIONS

Yang, et al., high numerical aperture epi-illumination selective plane illumination microscopy, bioRxiv, Feb. 28, 2018.

International Search Report for PCT/US19/16086 dated Apr. 24, 2019.

E.J. Botcherby et al. "An optical technique for remote focusing in microscopy". ScienceDirect. Optics Communications. vol. 281, pp. 880-887. 2008.

Matthew B. Bouchard et al. "Swept confocally-aligned planar excitation (SCAPE) microscopy for high-speed volumetric imaging of behaving organisms". Nature Photonics. <www.nature.com/naturephotonics>. vol. 9, pp. 113-119. Feb. 2015.

C. Dunsby. "Optically sectioned imaging by oblique plane microscopy". Optics Express, vol. 16, No. 25. pp. 20306-20316. Dec. 8, 2008.

* cited by examiner

HIGH NUMERICAL APERTURE SELECTIVE PLANE ILLUMINATION MICROSCOPY

CROSS-REFERENCE TO RELATED APPLICATIONS

This application is the 35 U.S.C. § 371 national stage application of PCT Application No. PCT/US2019/016086, filed Jan. 31, 2019, where the PCT claims the benefit of and priority to U.S. Provisional Application Ser. No. 62/624,261, filed Jan. 31, 2018, both of which are herein incorporated by reference in their entireties.

STATEMENT REGARDING FEDERALLY SPONSORED RESEARCH OR DEVELOPMENT

This invention was made with government support under grant no. R33 EB019784 awarded by the National Institutes of Health. The government has certain rights in the invention.

BACKGROUND

For over a decade, selective plane illumination microscopy (SPIM), or light-sheet microscopy, has been used successfully in fields as diverse as developmental and cell biology, anatomical science, biophysics, and neuroscience. SPIM systems enable easier imaging of three-dimensional samples and multiple configurations exist to accommodate various types of sample mounting. In a "flat" SPIM configuration, in which the optical pathways and table surface are parallel, a coverslip is not necessary. Instead, small tubes or cylinders of agarose gel are used to hold the sample in a tight focal space of objectives. To accommodate traditional mounting protocols, such as samples prepared on glass coverslips, other SPIM systems have been developed in which the optical table surface and optical pathways are perpendicular with the objectives, which point downward (i.e., imaging from above).

SPIM systems having objectives that point upwards (i.e., imaging from below) are able to accommodate more versatile sample mounting protocols, particularly for high-content imaging in which multi-well plates or microfluidic devices are used. Among such methods, oblique illumination microscopy and swept confocally aligned planar-excitation microscopy (SCAPE) use a single objective lens for illumination and detection without additional reflecting elements in the sample space. In such methods, the sample is illuminated obliquely, resulting in a tilted illumination plane. Further objective lenses positioned along the detection path are used to rotate the image plane such that all of the light arrives on the image sensor (e.g., camera) in focus. Unfortunately, large numerical aperture losses result from using such additional objective lenses in that manner. As a consequence, both oblique illumination microscopy and SCAPE systems have limited effective detection numerical apertures (e.g., less than 0.7). This is disadvantageous because high numerical apertures are essential to obtain the resolution required for subcellular imaging and sensitivity for single-molecule detection.

From the above discussion, it can be appreciated that it would be desirable to have SPIM systems that obliquely illuminate the sample but still have high effective detection numerical apertures.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have selective plane illumination microscopy (SPIM) systems that obliquely illuminate samples and have high effective detection numerical apertures. Disclosed herein are examples of such systems. The systems include a first objective that is used to illuminate and image a sample and a remote imaging module positioned remotely from the first objective that is used to rotate the image plane to account for the angle of the oblique illumination light that illuminates the sample. In some embodiments, the remote imaging module includes two "mismatched" objectives, meaning that the objectives are surrounded by or immersed in different media having different refractive indices. By way of example, one of the objectives of the remote imaging module can be an air objective surrounded by ambient air and the other objective of the remote imaging module can be a liquid objective that is immersed in a liquid, such as water or oil. When such a mismatched pair of objectives is used, higher effective detection numerical apertures are possible for the system. By way of example, the SPIM systems can have an effective detection numerical aperture of at least 0.7 and, in some embodiments, greater than 1.0. While the remote imaging module is described as being incorporated into a SPIM system, it will be appreciated that the remote imaging module can be used with other types of microscopy systems.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
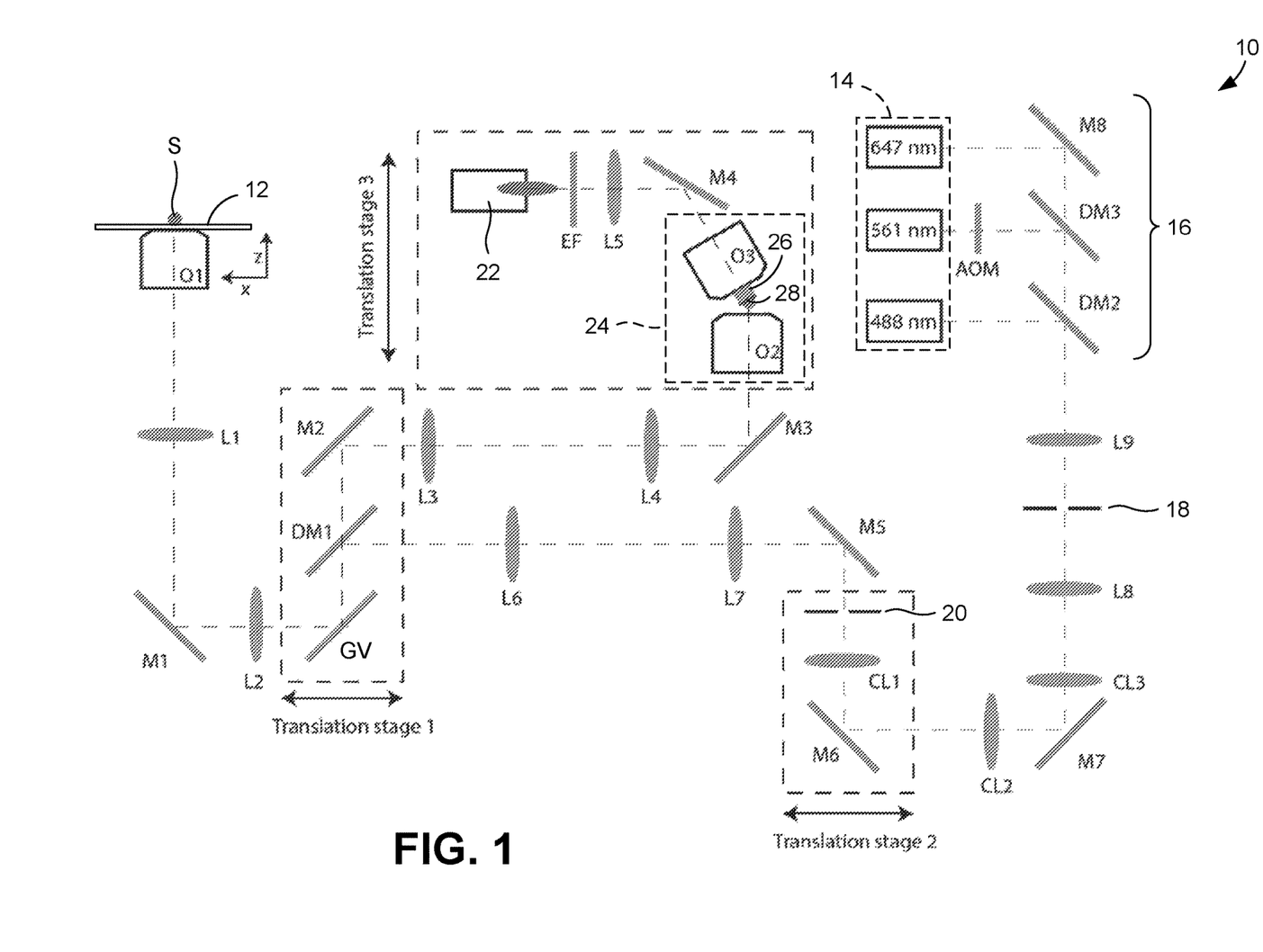
FIG. 1 is a schematic diagram of an embodiment of a high numerical aperture selective-plane illumination microscopy (SPIM) system.

FIG. 1 illustrates an example embodiment of a high numerical aperture SPIM system 10. As shown in this figure, the system 10 includes a plurality of optical elements, including various objectives, lenses, mirrors, modulators, and filters. Included in these optical elements is a first (sample) objective O1 that is positioned adjacent to a microscope stage 12 on which a sample S that is to be imaged is supported. In the illustrated example, the first objective O1 is positioned below the microscope stage 12 such that the system 10 is an "open-top" SPIM system. In some embodiments, the first objective O1 is a liquid-immersion objective, such as a water-immersion objective. By way of example, the first objective O1 can have a numerical aperture of 1.27. The first objective O1 is used for both illumination of the sample S and fluorescence collection from the sample in a fluorescence microscopy scheme. The first objective O1 focuses an oblique sheet of light on the sample S. In some embodiments, the light sheet has an angle of incidence of 60° relative to the optical axis of the first objective O1. At that angle, the excitation numerical aperture is approximately 0.3 and the waist and length of the light sheet is approximately 1 µm and 12.8 µm, respectively.

The light that illuminates the sample S is generated by a light source 14 that, in the example of FIG. 1, includes three lasers having central wavelengths of 488 nm, 561 nm, and 647 nm, respectively. The light generated by these lasers is emitted toward a series of mirrors 16, including a plain mirror M8 and two dichroic mirrors DM2 and DM3. These mirrors 16 reflect the emitted light and the dichroic mirrors further enable light reflected by another mirror to pass. As is further shown in the figure, the light from the 561 nm laser passes through an acoustic-optical modulator AOM prior to reaching the mirror DM3.

The light that is reflected by the mirrors 16 travels through a subsystem of optical elements that includes various lenses, apertures, and mirrors. In the example of FIG. 1, the light passes through a lens L9, passes through a pinhole aperture 18, passes through a lens L8, passes through a cylindrical lens CL3, is reflected by a mirror M7, passes through a cylindrical lens CL2, is reflected by a mirror M6, passes through a cylindrical lens CL1, passes through a slit aperture 20, is reflected by a mirror M5, passes through a lens L7, passes through a lens L6, is reflected by a dichroic mirror DM1, is reflected by a galvanometer mirror GV, passes through a lens L2, is reflected by a mirror M1, passes through a lens L1, and then reaches the first objective O1.

The galvanometer mirror GV enables scanning of the light sheet across the sample S for three-dimensional imaging. As can be appreciated from FIG. 1, the mirror M6, the cylindrical lens CL1, and the slit aperture 20 can each be mounted to a translation stage (i.e., translation stage 2). In similar manner, the dichroic mirror DM1 and the galvanometer mirror GV can be mounted to a further translation stage (i.e., translation stage 1). Such a mounting scheme facilitates adjustment of the system 10 and its optical elements. The system 10 is adjusted so that the illumination light sheet has an angle relative to the focal plane of objective O1 that is the same as the angle between the optical axes of the two remote objectives of a remote imaging module 24 described below.

Fluorescent light emitted from the sample S in response to the incident illumination light travels along a further subsystem of optical elements that forms a detection path, which leads to an image sensor 22, such as a camera. In the example of FIG. 1, the fluorescent light passes through the lens L1, is reflected by the mirror M1, passes through the lens L2, is reflected by the galvanometer mirror GV, passes through the dichroic mirror DM1, is reflected by a mirror M2 (which can also be mounted to translation stage 1), passes through a lens L3, passes through a lens L4, is reflected by a mirror M3, passes through the remote imaging module 24, is reflected by a mirror M4, passes through a lens L5, passes through an emission filter EF, and then reaches the image sensor 22. As can be appreciated from FIG. 1, each of the remote imaging module 24, the mirror M4, the lens L5, the emission filter EF, and the image sensor 22 can be mounted to a further translation stage (i.e., translation stage 3).

The detection path subsystem from the first objective O1 to the objective O2 in the remote optical component 24 acts as a relay system to generate a distortion-free three-dimensional image of the sample S. In some embodiments, this distortion-free three-dimensional image is generated by adjusting the configuration of the subsystem so that the magnification of the intermediate image equals to the ratio of refraction indices of the working media between objective O1 and objective O2. When objective O1 is a water-immersion objective and objective O2 is an air objective, this magnification is 1.33.

As mentioned above, the remote imaging module 24 is used to rotate the image plane to account for the angle of the oblique illumination light that illuminates the sample S. As shown in FIG. 1, the remote imaging module 24 comprises second and third objectives, i.e., objectives O2 and O3. In this example, in which the plane of illumination light has an angle of 30° with respect to the focal plane of objective O1, the second objective O2 produces an intermediate image at an angle of 30° relative to its focal plane. In particular, the optical axis of the third objective O3 is at an angle of 30° relative to the optical axis of the second objective O2 so as to re-image the intermediate image in focus. Objective O3 is adjusted so that its focal plane overlaps with the plane of the intermediate image. To obtain a volumetric image, the galvanometer mirror GV is conjugated to both of the pupil planes of the first objective O1 and the second objective O2. During operation of the system 10, the galvanometer mirror GV scans the illumination light sheet across the sample S and descans the image so that the intermediate image is always projected at the focal plane of the third objective O3. Neither the microscope stage 12 nor the first objective O1 need to move, thereby avoiding possible mechanical instability.

Significantly, the second and third objectives O2 and O3 are mismatched to minimize numerical aperture loss due to the tilted alignment between the two objectives. As used herein, the term "mismatched" means that the two objectives O2 and O3 are surrounded by or immersed in different media having different indices of refraction. In some embodiments, the second objective O2 is an air objective that is surrounded by ambient air while the third objective O3 is a water-immersion objective that is immersed in water. The second objective O2 has a large collection angle (e.g., 64.2° with NA=0.9) while the third objective O3 has a higher numerical aperture (e.g., NA=1.0) than the second objective O2. Both the second and third objectives O2, O3 have a long working distance, for example, 1 mm and 2 mm, respectively. Alternatively, both objectives O2 and O3 can be liquid-immersion objectives that are each immersed in a different liquid medium. For example, one of the objectives can be immersed in water and the other objective can be immersed in oil.

Figure 2:
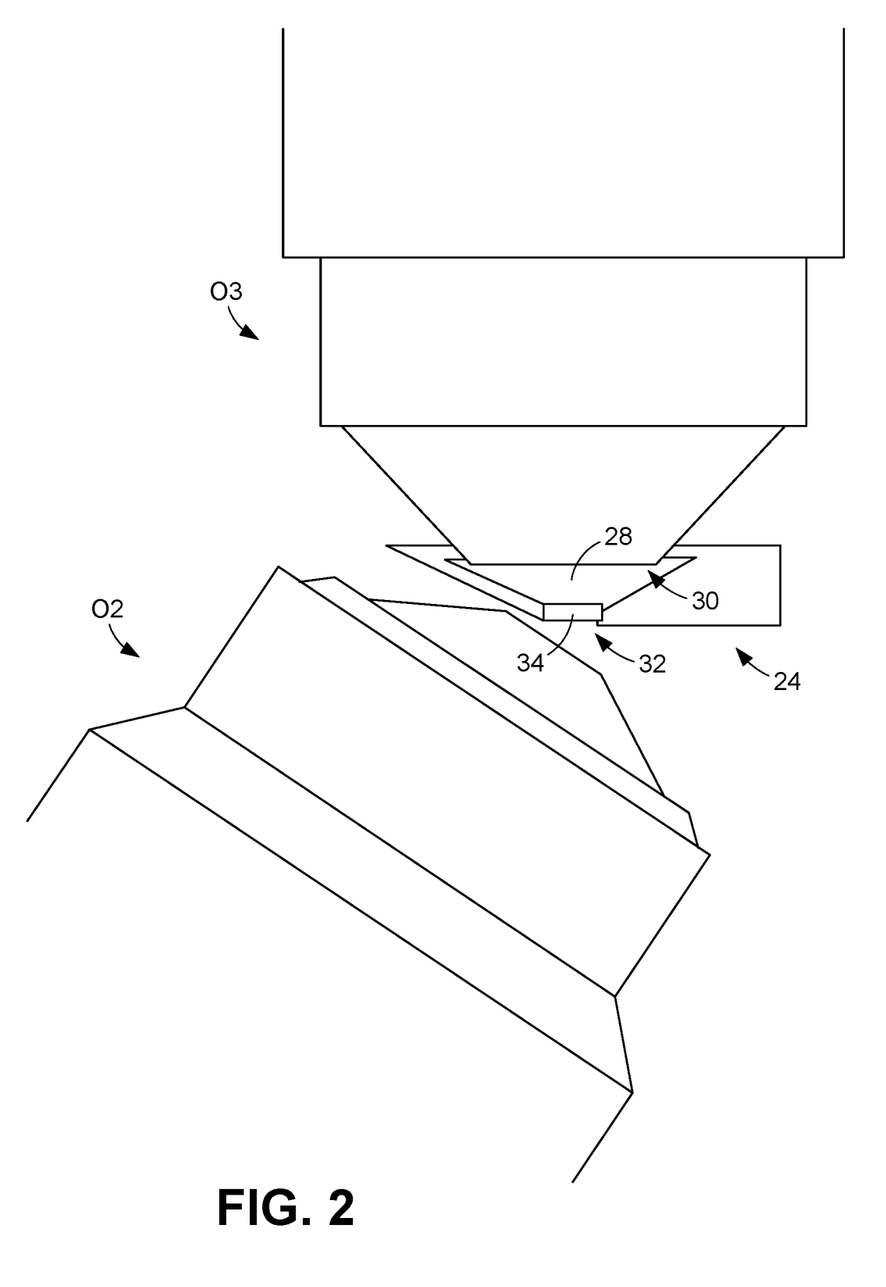
FIG. 2 is a schematic diagram of an embodiment of a separation device positioned between two objectives of a remote imaging module shown in FIG. 1.

A separation device can used to separate the focal spaces of the two objectives O2 and O3 to enable the use of media having difference refractive indices, such as air and water. FIG. 2 illustrates an example of such a separation device 26. In this example, the separation device 26 is mounted to the third objective O3 and is positioned between the third objective and the second objective O2. The separation device 26 includes a reservoir 28 in which a liquid can be contained. On a first side of the separation device 26 is a first opening 30 that leads to the reservoir 28. On a second side of the separation device 26 is a second opening 32 that also leads to the reservoir 28. The second opening 32, however, incorporates a window 34 that prevents the liquid from exiting the reservoir 28 and that enables light to travel to the third objective O3, which is immersed in the liquid. In some embodiments, the second window 34 can comprise a coverslip or other transparent sheet through which the light can pass. Regardless, the window 34 is oriented so as to be parallel to the intermediate image plane and such that its position can be tuned along the z' axis to minimize spherical aberration. In some embodiments, this tuning can be achieved through displacement of the translation stage 3 so that the air-side surface of the window 34 overlaps with the intermediate image plane.

Imaging an oblique plane requires obtaining a perfect (i.e., aberration-free) intermediate image of a volume region at a remote space. Optical systems designed to simultaneously satisfy both the sine and Herschel conditions fulfill this requirement. To achieve such conditions, the pupil planes of the first and second objectives O1 and O2 can be conjugated and the magnification of the intermediate image in the focal space of the second objective can be adjusted to be 1.33 along both the lateral and axial directions through two 4f-systems. As an example, the effective detection numerical aperture of the system 10 can be approximately 1.20 along the y axis and approximately 1.06 along the x' axis. A Zemax simulation further confirmed that the performance of the system 10 is consistent within a volume of 70 μm×70 μm×20 μm. The overall transmission efficiency of the remote imaging module 24 was 72.7% in the simulation.

Figure 3A:
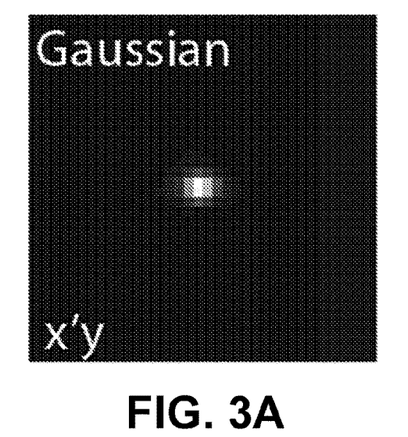
FIGS. 3A and 3B are cross-sectional images of 45 nm green fluorescent beads in the x'-y and y-z' planes, respectively, as excited by a Gaussian beam. The full width at half maximums (FWHMs) were 362.4 nm, 285.1 nm, and 533.8 nm along the x', y, and z' axes, respectively.
Figure 3B:
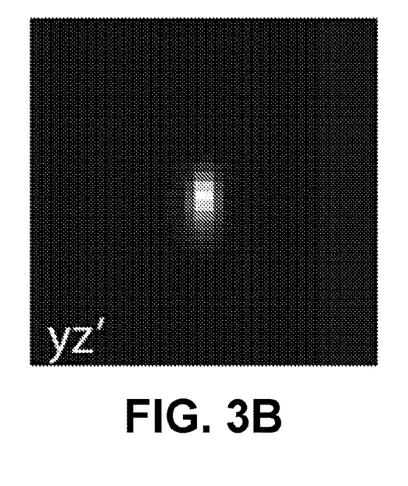

The illumination light sheet used in the system 10 can either be a Gaussian beam (see FIGS. 3A-3C) or a Bessel beam (see FIGS. 4A-4C), the latter having longer propagation distance and narrower width, but some side lobes. Fluorescent beads were imaged using a system similar to the system 10 and the x' and y resolutions were measured to be 339±18 nm and 316±8 nm, respectively, matching the detection numerical aperture estimation. The z' resolution was 443±29 nm with the Bessel beam and 596±32 nm with the Gaussian beam (FWHM, mean±standard deviation). Within an imaging volume of approximately 70 μm in y, 20 μm in z, and a galvanometer mirror scan range of approximately 100 μm in x, the aberration was negligible. This imaging volume can be further increased by scanning the sample stage, if necessary.

Figure 5:
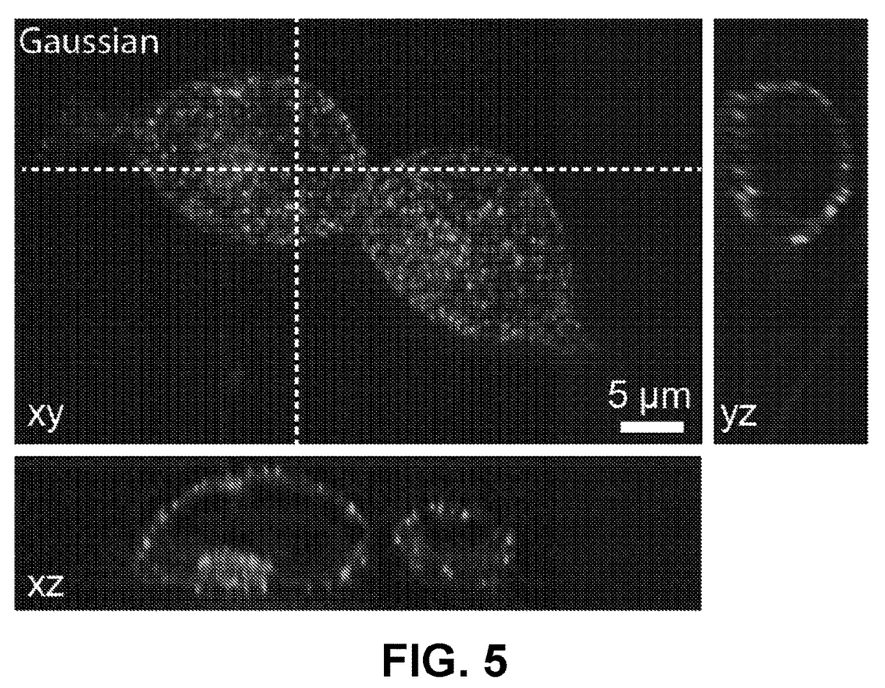
FIG. 5 includes images resulting from Gaussian excitations of HEK293T cells with endogenous clathrin A and lamin A/C labeled by mNeonGreen2$_{11}$ knock-in. Maximum intensity projection of the three-dimensional dataset in the x-y plane is shown together with representative cross-sections in the x-z plane and in the y-z plane.
Figure 6:
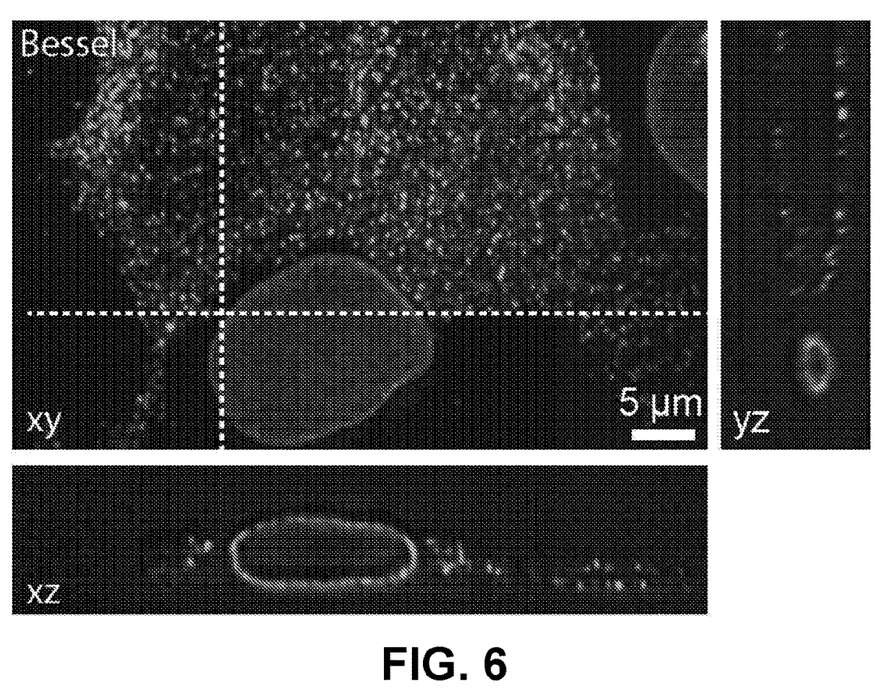
FIG. 6 includes images resulting from Bessel excitations of HEK293T cells with endogenous clathrin A and lamin A/C labeled by mNeonGreen2$_{11}$ knock-in. Maximum intensity projection of the three-dimensional dataset in the x-y plane is shown together with representative cross-sections in the x-z plane and in the y-z plane.
Figure 7A:
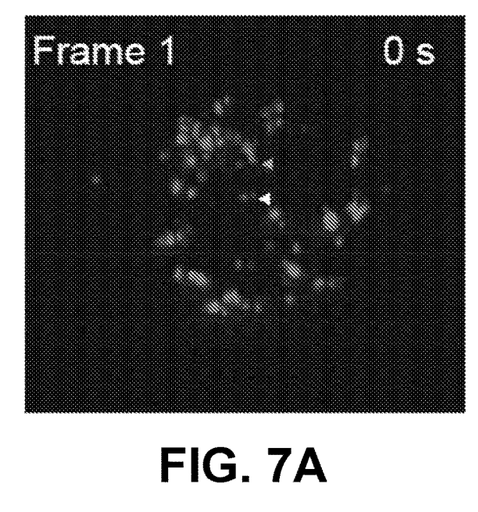
FIGS. 7A-7D are images obtained from fast and high content volumetric live imaging of *Drosophila* S2 cells. Four maximum intensity projection images are shown at different time points. Images were acquired at 15 volumes per second (volume size 35 μm×35 μm×7 μm, 34 slices per volume and camera running at 500 frames per second).
Figure 7B:
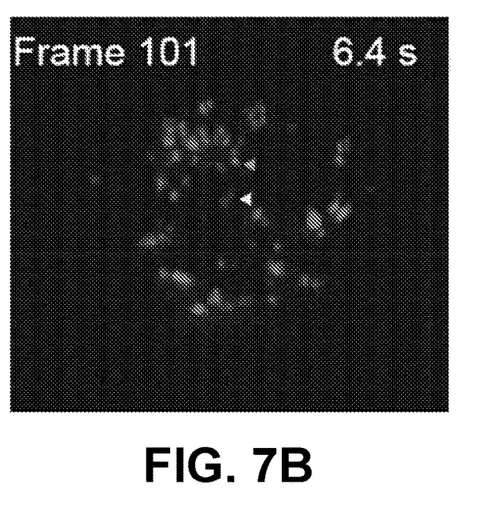
Figure 7C:
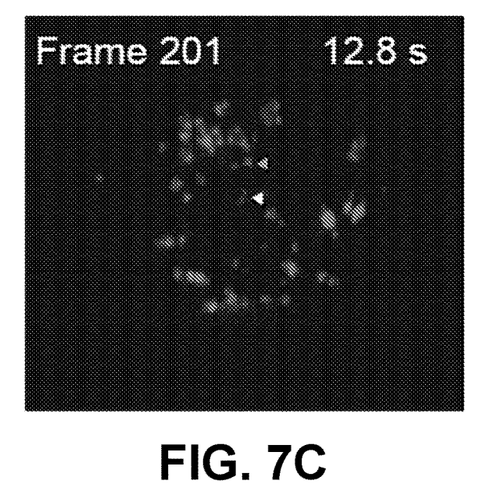
Figure 7D:
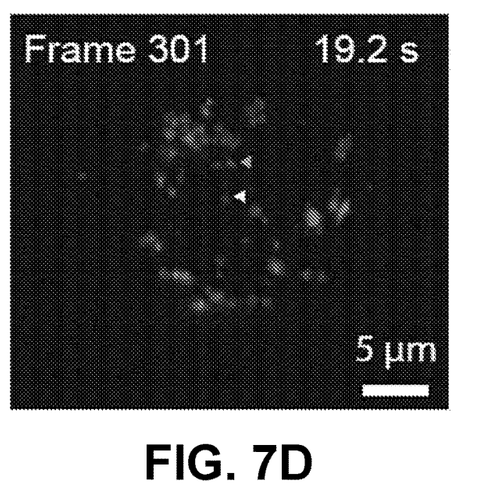

A variety of subcellular structures were imaged using an experimental system similar to system 10 to demonstrate the performance of the system in live cell microscopy. The subcellular structures were within cell lines grown in 8-well coverglass-bottomed chambers, including microtubules and mitochondria in HeLa cells (transient over-expression of EGFP-tubulin-6 and mRuby2-TOMM20-N-10, respectively), endogenously labeled clathrin structures in HEK293T cells (mNeonGreen2$_{11}$ knock-in for CLTA) (see FIGS. 5 and 6) and two-color imaging of nuclear lamina and lysosomes in HEK293T cells (mNeonGreen2$_{11}$ knock in for LMNA and LysoTracker Deep Red staining, respectively). The puncta of clathrin structures showed similar dimensions as measured earlier with fluorescent beads, demonstrating the practical spatial resolution of our system and enabling tracking of the movement of clathrin structures across the entire volume of cells. Even for endogenously labeled proteins, which typically exhibit much lower fluorescence signal than over-expressed ones, live-cell movies at 0.5-2 volumes per second were acquired continuously for more than 10 minutes. Greatly reduced photobleaching was achieved as compared to the results obtained using a spinning disk confocal microscope when recording a similar level of fluorescence signal from the same sample.

The system is particularly suitable for fast volumetric imaging because the galvanometer mirror is the only moving mechanical element in the system. Therefore, the scanning speed can be increased to the limit of the camera's readout. To demonstrate this capacity of fast imaging, *Drosophila* S2 cells were imaged with lysosomes labeled with LysoTracker Deep Red at 14.7 volumes per second. At this imaging speed, three-dimensional tracking of lysosome movement dynamics could be reliably performed (FIGS. 7A-7D). This imaging speed is approximately 4-5 times faster than other high-resolution light-sheet microscopes that have been reported and that speed can be further improved by parallel detection. This fast imaging capability will be extremely useful for live cell single-particle tracking, calcium imaging, and the like.

Figure 8A:
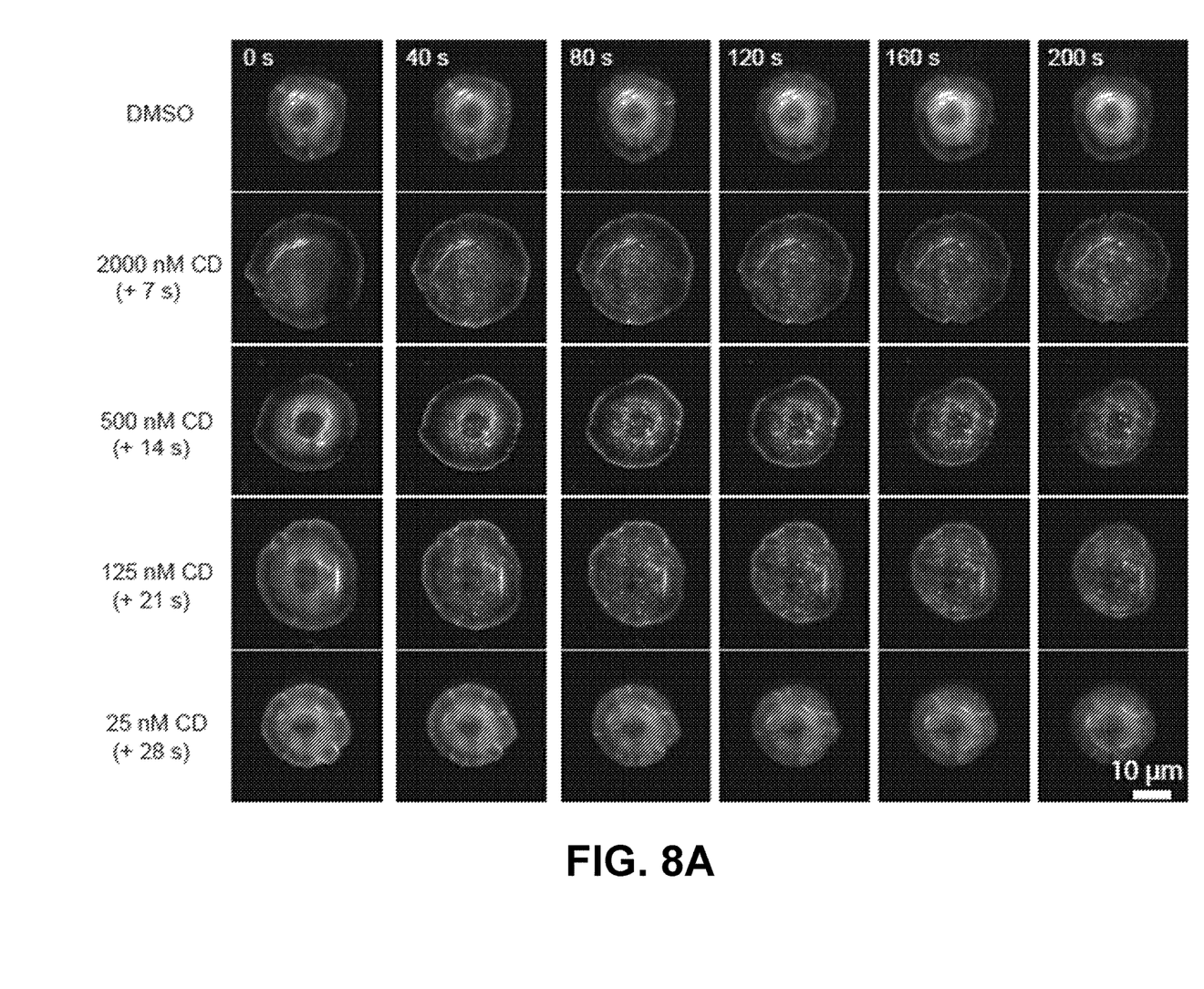
FIG. 8A includes images obtained from fast and high content volumetric live imaging of *Drosophila* S2 cells. *Drosophila* S2 cells stably expressing mRFP-actin were treated with DMSO and four different concentrations of Cytochalasin D, an inhibitor of actin polymerization. Representative max intensity projection images of the cells with different treatments and at different time points are shown.
Figure 8B:
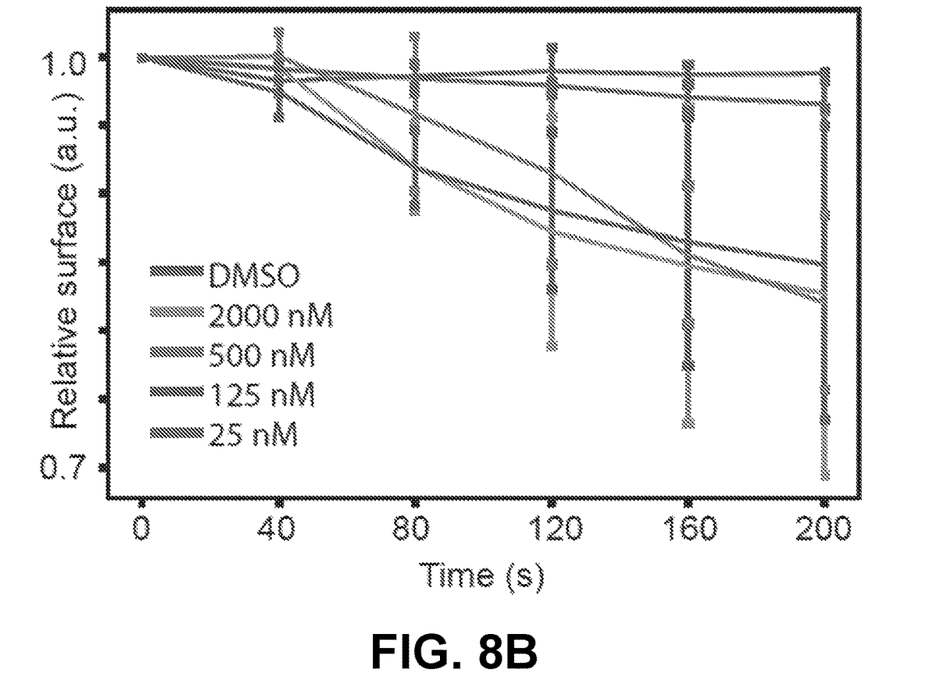
FIG. 8B is a graph that shows the normalized surface areas of the cells as a function of time.
Figure 8C:
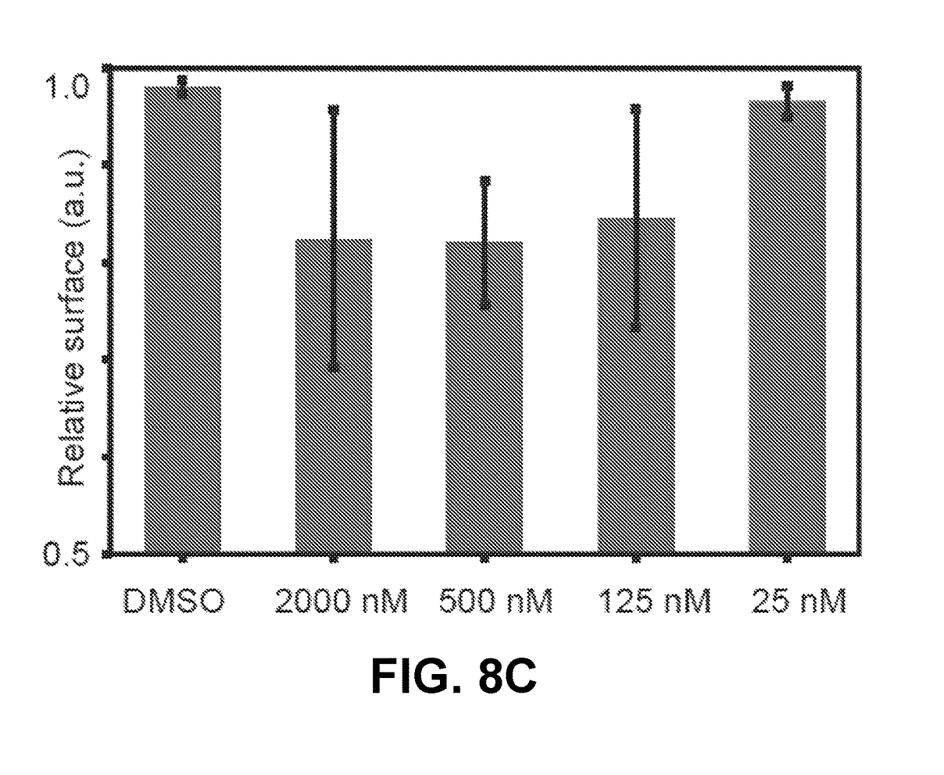
FIG. 8C is a graph that shows the surface areas change of the cells after treatment relative to before treatment. Values are averaged from three independent experiments, with error bars indicating the standard deviation.

Because the tested SPIM system is based on a typical inverted microscope configuration, it is possible rapidly move between different wells of a multi-well plate. To demonstrate this, imaging of drug responses on *Drosophila* S2 cells stably expressing mRFP-actin was performed. The cells were placed in a 96-well plate and different wells were treated with different concentrations of Cytochalasin D (CD), all directly on the microscope stage. The wells were then imaged over time with only a small time delay of 7 s between adjacent wells (which includes both the time required to move the stage as well as the acquisition time for a full volume). CD-treated cells clearly showed the retraction of the actin leading edge with the full dose-response curve acquired in one imaging session (FIGS. 8A-8C). This experiment illustrates the potential of the system in high-content and high-throughput volumetric imaging, even in multi-well plates.

The high light collection efficiency associated with the high detection numerical aperture of the system enables single-molecule imaging. As a demonstration, single-molecule, switching based, super-resolution microscopy of Hela cells stained for TOM20 was performed. On average, greater than 2,000 photons were detected for each photoswitching event when imaged at 50 frames per second. A lateral resolution of 37 nm was demonstrated. The oblique light sheet restricts excitation to a selective plane, reducing out-of-focus bleaching and out-of-focus background. Therefore, the system can be particularly useful for the imaging of densely labeled cells or with point accumulation for imaging in nanoscale topography (PAINT).

In summary, the disclosed system provides a versatile platform to image live samples at high spatial-temporal resolution. As a unique advantage, the system, or components thereof such as the remote imaging module, can be incorporated into existing inverted fluorescent microscopes (in a similar manner as a confocal spinning disk unit), so as to convert a conventional epifluorescence microscope into a SPIM system. The system/components can be easily integrated with wide-field epifluorescence microscopy for optogenetics and fluorescence recovery after photobleaching (FRAP) experiments. The system/components are also inherently compatible with numerous methods to improve the performance of light-sheet microscopy, including digitally scanned light sheets (to obtain more uniform illumination), the use of adaptive optics to reduce the systematic aberration, and the application of multi-view imaging to obtain isotropic resolution.

Example Apparatuses and Methods

Optical Setup

A water-immersion objective (O1, Nikon CFI Plan Apo IR 60XWI) of NA 1.27 was used for both illumination and fluorescence collection. The illumination light came from three lasers (Vortran Stradus 488 nm and 642 nm, Coherent Sapphire 561 nm). The beams were combined by two dichroic mirrors, collimated by a telescope composed of two achromatic lens, expanded by two cylindrical lenses (Thorlabs CL 50 mm and CL 200 mm) to form an elongated shape, and then clipped by a mechanical slit conjugated with the pupil plane of O1. In this configuration, the oblique light sheet is a Gaussian beam. To generate a Bessel light sheet, the slit can be replaced with a photomask (HTA Photomask). The photomask can generate the desired light distribution at the pupil plane of O1 by amplitude modulation. The full-width at half-maximum (FWHM) of the Gaussian and Bessel beams were respectively 730 nm and 554 nm along the z' axis, 12.8 um and 18.6 μm along the x' axis.

The illumination beam was then reflected by a dichroic mirror (DM, Chroma ZT405/488/561/640rpc) and intersected the back aperture of O1 off-center to generate an oblique light sheet at the focal space of O1. The offset was adjusted so that the illumination light sheet has an angle of 30° with respect to the actual focal plane of O1. The effective NA of the illumination light sheet was limited to approximately 0.3 so that it is not clipped by the edge of O1. The remote imaging module comprised two objective lenses (O2, Nikon CFI LU Plan Fluor EPI P 100×NA 0.9 and O3, Nikon CFI Fluor 60XW NA 1.0). The pupil planes of O1 and O2 are conjugated by two 4f-systems (L1-L4) and the lateral magnification from the sample space to the intermediate image is set to be 1.33, which is the ratio between the refraction indexes of the working media of O1 and O2. Under this condition, the axial magnification is also 1.33.

The optical axis of O3 was 30° relative to that of O2 so that O3 could re-image the intermediate image in focus. A 3D-printed separation device separated the focal space of the two objectives by a glass coverslip, with one side being air and the other side water. The water container was mounted on a motorized translation stage (Thorlabs PT1-Z8) so that it could be translated along the optical axis of O3. The objective lens O1 was mounted on a manual translation stage (Thorlabs CT1) for focus adjustment. The objective lens O3 was mounted on a piezo stage (Thorlabs DRV517) so that its focus could be finely tuned. By mounting all components of the remote imaging module on the same translation stage, it was found that their alignment is robust and stable, and routine realignment is unnecessary. The fluorescence was filtered by either individual band-pass filters (Chroma ET525/50m, ET605/70m and ET705/72m) or a quad-band filter (Chroma ZET405/488/561/640x) and then detected by a scientific CMOS camera (PCO Edge). The pixel size of the camera at the sample space was 133 nm.

A galvanometer mirror (Thorlabs, GVS011) was conjugated to both the pupil planes of O1 and O2. Rotating the galvanometer mirror scans the oblique light sheet across the sample (along the x axis) with the incident angle kept at 60°. The galvanometer mirror also descans the intermediate image at the focal space of O2 so that the intermediate image is always projected at the focal plane of O3. Neither the microscope stage nor the objective O1 need to move, ensuring mechanical stability. The scanning frequency of the galvanometer mirror can be as fast as a few hundred Hertz. Hence, the imaging speed was mostly limited by the readout time of the camera and the power of the excitation laser. The frame rate of the camera is as fast as 800 frames per second for a region of interest of 640×256 pixels. The galvanometer mirror scans the light sheet faithfully across approximately 100 μm. Outside of this range, either the illumination or the fluorescence light starts to be cropped. It is also possible to scan the sample with the microscope stage (PI, PILine M-687.UN) for longer ranges, albeit at slower speed. The entire system is controlled by the open-source, freely available software Micro-Manager.

To measure the transmission efficiency of the remote imaging module, collimated laser light was passed through the module. The transmission efficiency was then obtained by calculating the ratio of the exiting and entering light power, being respectively 73% at 488 nm, 67% at 561 nm, and 62% at 641 nm.

Figure 3C:
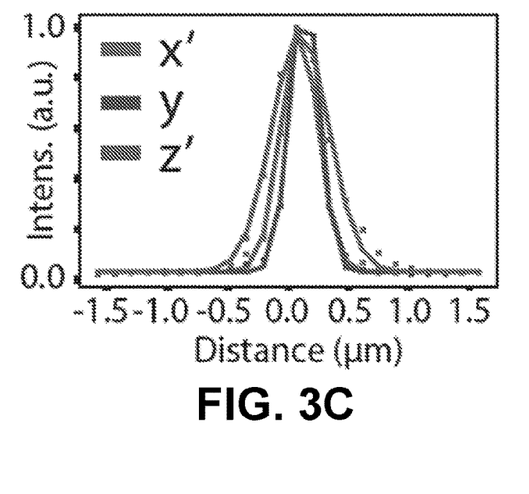
FIG. 3C is a graph of the point spread function (PSF) of the SPIM system used to capture the images of FIGS. 3A and 3B.
Figure 4A:
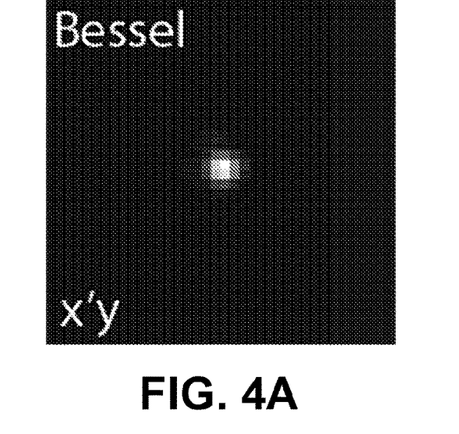
FIGS. 4A and 4B are cross-sectional images of 45 nm green fluorescent beads in the x'-y and y-z' planes, respectively, as excited by a Bessel beam. The FWHMs were 346.3 nm, 309.5 nm, and 408.9 nm along the x', y, and z' axes, respectively.
Figure 4B:
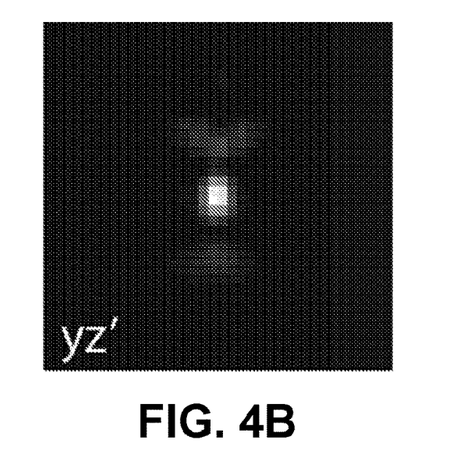
Figure 4C:
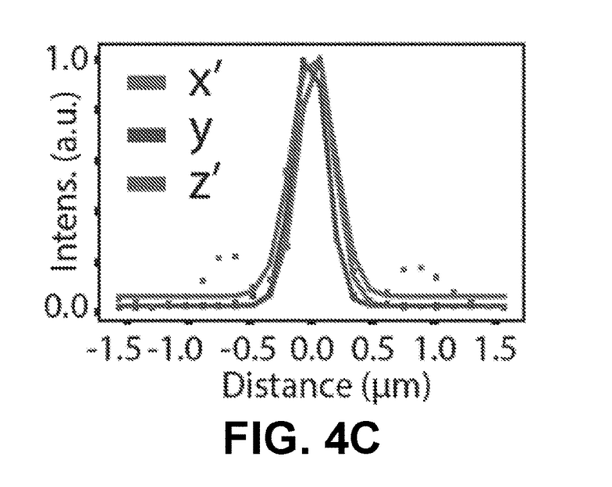
FIG. 4C is a graph of the PSF of the SPIM system used to capture the images of FIGS. 4A and 4B.

Characterization of Resolution with Fluorescent Beads 45 nm fluorescent beads were imaged to characterize the resolution of the system. The beads were embedded in 2% agarose gel and then sandwiched between a glass coverslip and a glass slide. The sample was then placed on the microscope stage with the coverslip side facing the objective. The excitation wavelength was 488 nm and the corresponding emission filter was a bandpass 525/50 filter. The raw images were slices across the sample in the x'-y plane, 30° to the x-y plane. FIGS. 3A, 3B, 4A, and 4B show the cross-sections of bead images in the x'-y and y-z' planes. The FWHMs of the bead images were 339±18 nm and 316±8 nm (mean±standard deviation for all values in this section) along the x' and y axes. The FWHM was 596±32 nm along the z' axis at the waist of the light sheet with the Gaussian excitation beam (FIG. 3C). At 10 μm away from the waist, this value increased to 1227 nm±287 nm, both due to the divergence of the light sheet and increased aberrations. When using the Bessel beam, the FWHM of the PSF along the z' axis was 443±29 nm at the beam waist and 667±300 nm at 10 μm away from the waist, clearly improving the axial resolution (FIG. 4C). These values were obtained by averaging 5-7 beads.

Data Acquisition, Processing, and Viewing

Micro-Manager was used for device control and multi-dimensional data acquisition. The galvanometer mirror scanner was set up as a digital-analogue z stage, controlled by one analog output channel of the NI PCIe 6323 DAQ card. The lasers emission states were controlled via an Arduino Uno board. The galvanometer mirror scanner and the lasers were hardware-synchronized through the TTL output of the PCO sCMOS camera.

The raw SPIM data were obtained in the x'-y-z' space. The data were then de-skewed and deconvolved using the measured PSF and rotated to the x-y-z space. This process was performed with a free-online package (https://www.flintbox.com/public/project/31374/) produced by Janelia Research Campus. Deconvolution was applied to the cell images shown in FIGS. 5-7, but not to the bead image for resolution measurement in FIGS. 4 and 5.

The free software ChimeraX by UCSF was used to view and demonstrate the volumetric date in 4D.

Leading Edge Intensity Measurement

The leading edge intensity of the *Drosophila* S2 cells treated with DMSO and Cytochalasin D is measured from the maximum intensity projection images. The contour of the leading edge in the images is first recognized. The surface area of the leading edge is then determined in unit of the pixel number. The surface areas are normalized to that of the first frame of a time lapse data.

Global Exposures with Rolling Shutter

The rolling shutter mode of the sCMOS camera provides readout time as short as 1 ms for a region of interest of 200 rows, facilitating fast imaging. Although this mode is fast, the readout of each row is no longer simultaneous. When the frame rate is close to the maximum readout speed of the camera, this asynchronous readout causes PSF distortion. Although global shutter mode can solve this problem, it increases the readout noise and slows down the readout by a factor of 2. Therefore, global exposure with rolling shutter was implemented by triggering pulsed laser illumination only during the time when all rows were exposing. The effective imaging time for each frame was thus the exposure time plus the readout time. Global exposure was realized through the NI PCIe 6323 DAQ card using LabVIEW programming.

Cell Culture and Transfection

To prepare sample for microscopy, knock-in cells were grown on an 8-well glass bottom chamber (Thermo Fisher Scientific). In order to achieve better cell attachment, 8-well chamber was coated with fibronectin (Sigma-Aldrich) for one hour before seeding cells.

*Drosophila* S2 cells were cultured in Schneider's *Drosophila* Medium (Gibco) supplemented with 10% heat inactivated fetal bovine serum and penicillin/streptomycin (50 µg/ml). The cells were plated into 8-well plates coated with 0.5 mg/mL solution of Concanavalin A and then incubated for 1 day. The next day 225 µL 50 nM LysoTracker Deep Red dye solution was added to each well for 30 minutes prior to imaging.

For actin drug treatment experiments, live S2 cells stably expressing mRFP-actin were imaged in the presence of Cytochalasin D or DMSO. The coordinates of cells to be imaged in adjacent wells of the 96-well plate were marked, a baseline image of each cell was acquired, and then Cytochalasin D and DMSO was simultaneously added directly on the microscope stage. The drug was prepared at 2x concentration in imaging media before addition to cells to achieve the targeted concentration.

STORM Imaging

For stochastic optical reconstruction microscopy (STORM) imaging, Hela cells were plated in LabTek-II 8-well chambers, washed twice with phosphate buffered saline (PBS), fixed with paraformaldehyde (PFA) (4% in PBS, 10 minutes), washed three times with PBS, then permeabilized and blocked (0.5% Triton X-100, 3% bovine serum albumin in PBS, 30 minutes). Next, cells were incubated with primary antibody (Tom20 Antibody (29): sc-136211, mouse monoclomal, Santa Cruz Biotechnology) for two hours at room temperature. The cells were then washed three times (10 minutes each, PBS) and incubated with secondary antibody (Donkey anti Mouse, Jackson Immuno Research, 1.6 µg/ml, labeled with Alexa Fluor 647, the ratio between antibody and dye is about 1:0.7) for 1 hour at room temperature, washed three times (10 minutes each, PBS) and post-fixed (3% PFA and 0.1% gluteraldehyde in PBS, 10 minutes). Finally, the sample was washed three times (PBS) and stored at 4° C. before imaging.

The sample was illuminated by the 642 nm laser and was imaged at 50 Hz. A total of 20 thousand frames were obtained. Single molecule localization analysis was performed with home-written C++ software. The data was drift corrected using direct cross-correlation method.

The invention claimed is:

1. A microscopy system comprising:
   a first objective positioned adjacent to a sample to be imaged, the first objective being configured to both illuminate the sample with oblique illumination light and collect light from the sample; and
   a remote imaging module positioned remotely from the first objective and the sample, the remote imaging module being configured to rotate the image plane of the collected light to account for an angle of the oblique illumination light, the remote imaging module including a second objective and a third objective, wherein the second objective is an air objective and the third objective is a liquid-immersion objective, such that the second and third objectives are mismatched with each other in that they are configured to be surrounded by or immersed in different media having different indices of refraction.

2. The system of claim 1, wherein the microscopy system is a selective plane illumination microscopy (SPIM) system.

3. The system of claim 2, wherein the first objective is positioned below the sample.

4. The system of claim 3, further comprising a microscope stage configured to support the sample and wherein the first objective is positioned below the microscope stage.

5. The system of claim 1, wherein the first objective is a water-immersion objective.

6. The system of claim 1, wherein the third objective is water-immersion objective that is configured to be immersed in water.

7. The system of claim 1, wherein the second objective and the third objective are positioned adjacent to each other and further comprising a separation device positioned between the second and third objective that is configured to contain a liquid in which the third objective is immersed during operation of the system.

8. The system of claim 7, wherein the separation device is mounted to the third objective.

9. The system of claim 7, wherein the separation device comprises a first side that includes a reservoir configured to contain the liquid and a second side that includes a window to which the second objective is immediately adjacent that enables light to travel from the second objective, through the liquid, and to the third objective.

10. The system of claim 9, wherein the separation device is mounted to the third objective.

11. The system of claim 1, further comprising a translation stage and wherein the remote imaging module is mounted to the translation stage.

12. The system of claim 1, wherein the system has an effective detection numerical aperture greater than 0.7.

13. The system of claim 1, wherein the system has an effective detection numerical aperture greater than 1.0.

14. The system of claim 1, further comprising a light source that generates the light that illuminates the sample.

15. The system of claim 1, further comprising an image sensor that captures the light collected from the sample.

16. A remote imaging module configured to rotate an image plane of light within an optical system, the module comprising:
  a first objective having a first optical axis positioned on the remote imaging module, the first objective being an air objective; and
  a second objective positioned adjacent to the first objective on the remote imaging module, the second objective having a second optical axis that forms an angle with the first optical axis, the second objective being a liquid-immersion objective; and
  a separation device positioned between the first objective and the second objective, the separation device including a first side having a reservoir that is configured to contain liquid in which the second objective is immersed during operation of the remote imaging module and a second side having a window to which the first objective is directly adjacent that enables light to travel from the first objective, through the liquid, and to the second objective;
  wherein the first objective and the second objective are mismatched with each other in that they are configured to be surrounded by or immersed in different media having different indices of refraction.

17. The remote imaging module of claim 16, wherein the second objective is water-immersion objective that is configured to be immersed in water.

18. The remote imaging module of claim 16, wherein the separation device is mounted to the second objective.

19. A method for imaging a sample, the method comprising:
  illuminating a sample with oblique light using a first objective positioned adjacent to the sample;
  capturing light from the sample also using the first objective; and
  rotating the image plane of the captured light using a remote imaging module that is positioned remotely from the first objective and the sample, the remote imaging module comprising a second objective and a third objective that are positioned adjacent to each other, the second objective being an air objective exposed to ambient air and the third objective being a liquid-immersion objective immersed in a liquid, such that the second and third objectives are mismatched with each other in that they are surrounded by or immersed in different media having different indices of refraction.

20. The method of claim 19, wherein illuminating a sample further comprises illuminating the sample from below.

21. A microscopy system comprising:
  a first objective positioned adjacent to a sample to be imaged, the first objective being configured to both illuminate the sample with oblique illumination light and collect light from the sample; and
  a remote imaging module positioned remotely from the first objective and the sample, the remote imaging module being configured to rotate the image plane of the collected light to account for an angle of the oblique illumination light, the remote imaging module including a second objective and a third objective, wherein the second objective is a liquid-immersion objective configured to be immersed in a first liquid having a first index of refraction and the third objective is a liquid-immersion objective configured to be immersed in a different, second liquid having a different, second index of refraction, such that the second and third objectives are mismatched with each other in that they are configured to be surrounded by or immersed in different media having different indices of refraction.

22. A method for imaging a sample, the method comprising:
  illuminating a sample with oblique light using a first objective positioned adjacent to the sample;
  capturing light from the sample also using the first objective; and
  rotating the image plane of the captured light using a remote imaging module that is positioned remotely from the first objective and the sample, the remote imaging module comprising a second objective and a third objective that are positioned adjacent to each other, the second objective being a liquid-immersion objective immersed in a first liquid having a first index of refraction and the third objective being a liquid-immersion objective immersed in a different, second liquid having a different, second index of refraction, such that the second and third objectives are mismatched with each other in that they are surrounded by or immersed in different media having different indices of refraction.

* * * * *